Feb. 3, 1970　　　　　J. A. PEOPLES　　　　3,493,003
MULTIWAY VORTEX VALVE SYSTEM
Filed Nov. 16, 1967　　　　　　　　　　　　　2 Sheets-Sheet 1

INVENTOR.(S)
JERRY A. PEOPLES
BY
Charles C. Wells
ATTORNEYS

United States Patent Office 3,493,003
Patented Feb. 3, 1970

3,493,003
MULTIWAY VORTEX VALVE SYSTEM
Jerry A. Peoples, Huntsville, Ala., assignor to the United States of America as represented by the Administrator of the National Aeronautics and Space Administration
Filed Nov. 16, 1967, Ser. No. 683,507
Int. Cl. F15c 1/08
U.S. Cl. 137—81.5                        7 Claims

ABSTRACT OF THE DISCLOSURE

A pure fluid device composed of a plurality of vortex amplifiers each connected to a common power jet stream and connected to a common control jet stream. Orifices on each vortex amplifier control jet stream conduit are partially or completely closed simultaneously by one control rod thereby varying the pressure and velocity of each vortex amplifier's control jet stream. Proportionate amplification of each vortex amplifier output is thereby obtained allowing the integrated pure fluid device to function as a proportional multi-output amplifier.

BACKGROUND OF THE INVENTION

The invention described herein was made by an employee of the United States Government and may be used by or for the Government for governmental purposes without the payment of any royalities thereon or therefor.

This invention relates to pure fluid amplifiers and more particularly to vortex amplifiers arranged in sequence to produce a multi-directional, proportional flow valve.

Prior mechanical multiway valves, such as four-way servo valves, have employed mechanical means, usually a power spool, to divert a power or supply flow through differing outlet ports. These mechanical means required close tolerances, on the order of 10–50 microns, to facilitate efficient operation. Impurities, e.g., dust carried by the ported fluid and metal particles produced by the sliding contact of the mechanical ports, often amounted to sufficient contamination to "freeze" the valve.

There were also flow limitations in these mechanical, multiway valves. The flow could not usually be maintained through a multiplicity of outlet ports simultaneously because of structural limitations of the mechanical activating means. To make flow periodic, mechanical means within the flow had to be employed.

Present pure fluid devices providing for multi-directional outlets are of the momentum exchange or beam element type that employs the momentum of control jet streams to deflect a power jet stream to a desired outlet passage. Such devices do not allow multi-directional flow to be either simultaneously multi-directional or proportional in each output direction.

Further, it is a characteristic of these beam elements to "load up," i.e., their pressure recovery (under load, e.g., a valve restriction, as opposed to wide open flow) is less for the same intake conditions than obtained from a vortex amplifier. This is because the operation of beam elements depends upon continuous flow through the element. When loading restricts this flow, beam element performance degrades. The degradation is manifested in the form of less pressure recovery and output momentum. This output momentum is directly proportional to the mass of the output fluid and the velocity of the output fluid. The vortex amplifier augments the exchange of momentum occurring when the power jet stream and the control jet stream interact by increasing the velocity of the flow after such interaction. This increase in velocity results from the shape of the vortex amplifier's interaction chamber. The chamber is shaped as a closed, shortened cylinder with the power jet stream entering perpendicularly to its side wall and the control jet stream entering tangentially to its side wall. The outlet orifice is in the center of one of the end walls. The interaction of the power and control jet streams creates annular flow in the chamber. Conservation of momentum requires that the velocity of the flow increase as the flow approaches the center outlet orifice. This increase or amplification in output velocity results in an increase in output momentum of the vortex amplifier which does not occur in the beam element device. It follows that multi-directional flow beam elements have more limited power gains than similar vortex amplifier elements.

SUMMARY OF THE INVENTION

The present invention is a multi-vortex amplifier system that achieves proportionally amplified, multi-directional flow. This is accomplished by the vortex amplifier's characteristic of allowing flow proportionate to the control stream input. Therefore, when each vortex amplifier in the system is connected to a common power jet stream, the output flow of each is varied by varying the control input of each. To vary the control input of each vortex amplifier, all are connected to a common control jet stream by conduits which have convergent nozzles which can be closed or partially closed. The variation in the status or closure of each vortex amplifier's control stream convergent nozzle varies the pressure and therefore the velocity of their control stream input. These constricted orifices are positioned so that the status, i.e., whether it is open, closed, or partially open, of any one or any two of the orifices can be controlled simultaneously by pressing against the open end of the orifice. So, by varying the control input of each vortex amplifier, proportionate flow through a number of outlets equal to the number of vortex amplifiers can be accomplished by the integrated system.

The use of vortex amplifiers in the invention overcomes, to a great extent, prior contamination problems in mechanical, multiway valves. The vortex amplifiers can port fluids containing contamination particles up to the 300–400 micron level. Also, a source of contamination particles is eliminated in that vortex amplifiers have no mechanical control means in the flow path which might be a source of metal particles.

Using vortex amplifiers to control flow in multiway valves instead of mechanical means greatly increases the flexibility of such valves. This is because vortex amplifiers allow an increase or decrease in flow in direct proportion to control jet stream pressure, which pressure can be widely varied for a particular size vortex amplifier. A plurality of such vortex amplifiers can thus pro-

3 le proportionate flow in varying degrees through different outlet orifices simultaneously.

The elimination of the mechanical control means in the wer flow greatly increases the reliability of multiway lves by eliminating a source of breakdown. Also, the st of machining close fitting mechanical parts is eliminated.

Pure fluid devices, such as beam elements, while eliminating mechanical control means, do not allow simulaneous multi-directional flow nor simultaneous, proportionally amplified, multi-directional flow using one power stream. A multi-vortex amplifier system allows both the vortex amplifier can operate in unison or in any mbination from one power jet stream.

The multiway vortex valve system overcomes the power in limitations of beam elements through use of vortex aplifiers which are not as limited as to power gains. iis enables the system to operate devices requiring higher wer gains.

It is broadly an object of the invention to provide a lve system capable of producing from one power stream ws of varying amplification in many directions simultaneously.

Another object of the invention is to provide such a ultiway system which is unaffected by high levels of intamination and which eliminates a source of such contamination by removal of mechanical control means without the flow path.

It is further an object of the invention to provide a ultiway valve system with no mechanical control means the flow path.

Still another object is to provide a multiway valve system with high power gains.

The above and still further objects, features and advanges of the present invention will become apparent upon insideration of the following detailed description of the iecific embodiment thereof, especially when taken in injunction with the accompanying drawings.

DESCRIPTION OF THE PREFERRED EMBODIMENT

Figure 1:
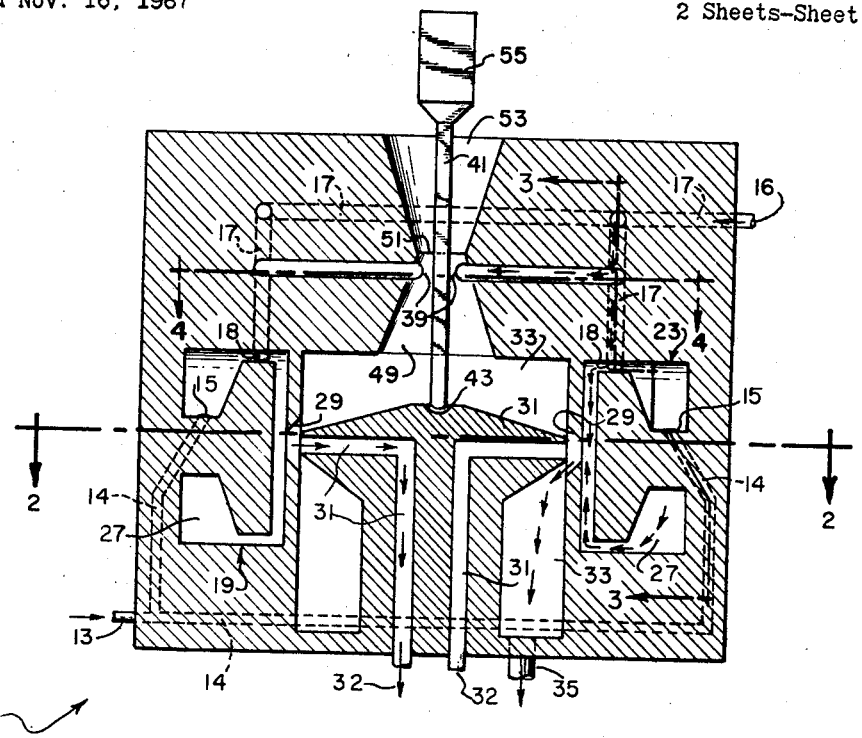
FIGURE 1 is a vertical sectional view of a multiway ortex valve system according to the present invention.

Referring now to FIGURE 1 showing a vertical cross ction of a multiway vortex valve system, there is a valve ousing 11 constructed from a suitable solid material. Iousing 11 is connected by conduit 13 to a power fluid apply (not shown) which is to be amplified and selecvely ported by the valve system. The power fluid input rom conduit 13 flows through internal conduits 14 to our vortex amplifiers 19, 21, 23, 25 whose configuration is est shown in FIGURE 2. Fluid from conduit 14 is incted into the vortex amplifiers 19, 21, 23, 25 via rifices 15.

It should be understood that the invention is not retricted to the use of four vortex amplifiers and, dependig on the contemplated use of the valve system, a number f vortex amplifiers equal to the number of output flows esired can be used. The vortex amplifiers need not be iametrically positioned within the valve housing as odd umbered pluralities of the vortex amplifiers may be rouped to effectuate an odd number of outputs if desired.

Valve housing 11 is connected to a control fluid input ource (not shown) by conduit 16. This second fluid inut is used to both control and amplify the fluid power upply after flowing through internal conduits 17 to

4 orifices 18 which tangentially inject a control fluid input into each of the vortex amplifiers 19, 21, 23, 25.

Figure 2:
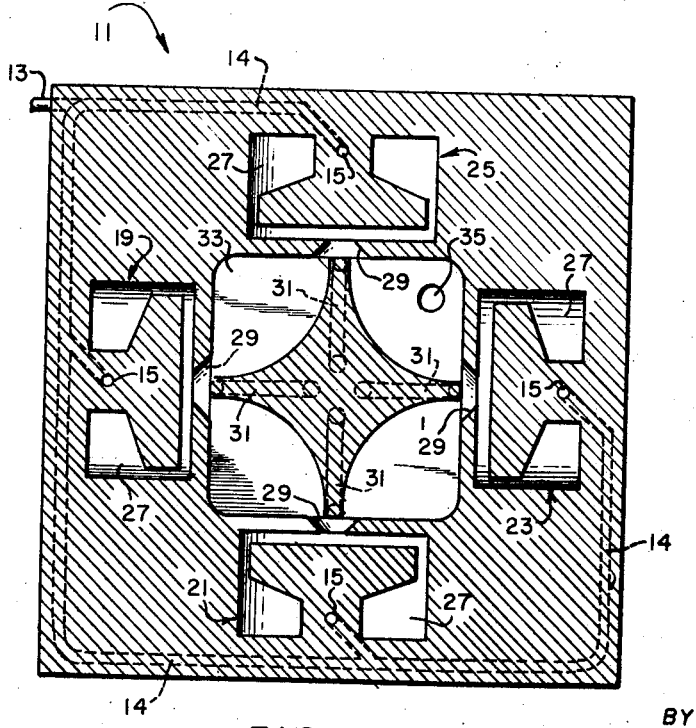
FIGURE 2 is a horizontal sectional view taken through ction lines 2—2 of FIGURE 1.
Figure 3:
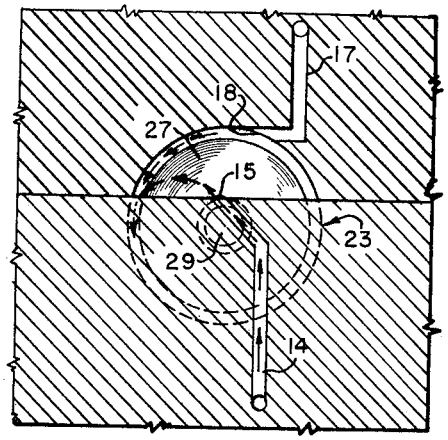
FIGURE 3 is a partial multi-sectional side view taken long section lines 3—3 of FIGURE 1.

Referring now to FIGURE 3 to illustrate the controlling and amplifying of the power fluid stream by the control fluid input or control jet, there is represented a multiplane cross sectional side view of vortex amplifier 23 of FIGURE 1 taken along section lines 3—3. The power fluid stream flows through internal conduit 14 into vortex amplifier 23 by way of orifice 15. The power fluid stream is then deflected in vortex amplifier's interaction chamber 27 by the control jet tangentially injected by orifice 18. The interaction of the two flows creates an annular flow in the interaction chamber 27. The tangential velocity of the annular flow increases due to conservation of momentum as the annular flow approaches the vortex amplifier outlet, a conical orifice 29, which is best shown in FIGURE 2. This increase in velocity of the annular flow is the amplifying effect and allows the amount of flow through the vortex amplifier to be controlled.

The control is achieved by varying the control jet velocity which determines ultimate annular velocity at the outlet orifice 29. At low annular velocities the output of the vortex amplifier enters conduit 31, best shown in FIGURE 1, and becomes one of the four output flows of the valve system through orifices 32. At higher annular velocities part of the output at orifice 29 "spins out" following the funnel shape of orifice 29 into return chamber 33 where it is collected and returned by conduit 35 (partially shown) to the fluid power supply (not shown). The remainder of the vortex amplifier output flows through conduit 31 to become one of the output flows through orifice 32 of the valve system.

Thus, each output flow of the system can be reduced in direct proportion to the annular velocity of its related vortex amplifier. Likewise, the velocity amplification of the output flow is directly related to annular velocity within the vortex amplifier which depends on control jet velocity.

If control jet velocity becomes great enough, the entire output of the vortex amplifier "spins out" through orifice 29 into return chamber 33 to be shunted by conduit 35 (partially shown) to the fluid power supply. The "spin out" effect is facilitated by "boundary layer lock on" or "wall attachment" occurring when the output locks on to the conical shaped wall of orifice 29. When the entire output "spins out," one of the valve system's outputs through orifice 32 is completely stopped. The "wall attachment" would also facilitate backflow through orifice 32 and conduit 31 into return chamber 33 by reducing pressure in conduit 31 and by deflecting the backflow into chamber 33.

It should be understood that even though vortex amplifiers have a wide range of amplification as compared to other pure fluid devices, it may be desirable to have vortex amplifiers, within such a multiway vortex valve system as disclosed, have varying ranges of possible amplification. Therefore, the invention could have vortex amplifiers of different size and internal design to accomplish this.

Figure 4:
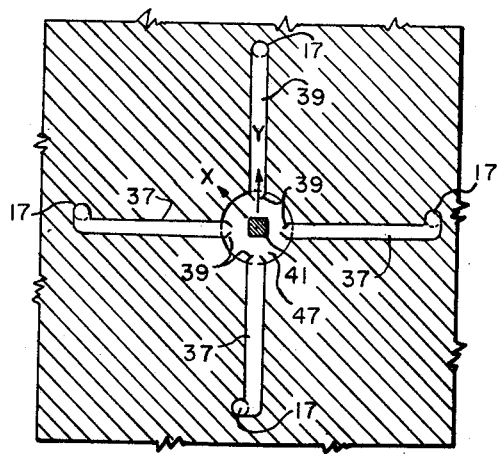
FIGURE 4 is a partial horizontal section view taken long section lines 4—4 of FIGURE 1.

To vary the control jet which in turn varies the amplification and output flow of each vortex amplifier, we observed in FIGURE 4, conduits 37 connected to conduits 17 (which conduct the control jet flow to vortex amplifiers 19, 21, 23, 25). These conduits 37 lead to convergent nozzles 39 which can be opened or closed to vary the pressure in conduits 37 and therefore, also in conduits 17 thereby varying the control jet flow.

To vary pressure, nozzles 39 are partially or fully closed thereby proportionately varying the pressure in control jet conduits 37 and 17. To close or partially close nozzles 39, there is shown in FIGURE 1, a square control rod 41 mounted in ball joint 43 so as to allow movement in any direction in the plane of FIGURE 4 which shows a cross section of square control rod 41.

To vary two vortex amplifier outputs and thus two of the valve system's outputs simultaneously, square rod 41 would be moved, for example, in X direction (FIGURE 4) and depending upon how far rod 41 was moved, two vortex amplifier outputs and thus two system outputs would be proportionately varied both in amount of outflow and in velocity of outflow (amplification). Similarly, to proportionately vary one output, square control rod 41 would be moved, for example, in the Y direction. Thus, it is seen that any one or any two outputs 32 (FIGURE 1) can be proportionately decreased.

Likewise, any one or any two outputs through orifice 32 can be completely stopped if square rod 41 touches convergent nozzles 39. This is because with a particular nozzle 39 closed, the pressure in conduits 37 and 17 would be increased sufficiently to cause the control jet flow to be great enough to increase the annular velocity within the vortex interaction chamber 27 to a point where the entire output of the vortex valve would "spin out" through orifice 29 into return chamber 33 as shown in FIGURE 1.

It should be noted that through proper design of the control rod 41, any plurality of convergent nozzles 39 may be controlled independently and simultaneously. Additionally, to control simultaneously a plurality of nozzles 39, the nozzles 39 can be grouped so that one side of a multi-sided control rod 41 can be moved against the group simultaneously to partially or fully close them.

In FIGURE 4 with square control rod 41 in the center position, all convergent nozzles 39 are open and all outputs through orifices 32 (FIGURE 1) flow together. The flow from any of nozzles 29 that are not partially or fully closed enters frusto-conical chamber 49 and flows to return chamber 33 (FIGURE 1) and out return conduit 35 to be retrieved by the power fluid supply. At the top of conical chamber 49 in FIGURE 1 is shown rubber means 51 for allowing movement of square control rod 41 while not allowing flow from open jets 39 to leave the valve housing 11 by way of inverted frusto-conical chamber 53.

While not shown, it should be understood that any suitable deflection means (manual, electromagnetic, etc.) may be employed to move control rod handle 55 (FIGURE 1) in a desired direction. It is also clear that by periodic or non-periodic movement of control rod handle 55, periodic or non-periodic flow could be obtained through any of orifices 32.

The embodiment as described, is a multiway valve system which allows each separate output to be amplified as to velocity and to be controlled as to amount of flow. The vortex amplifiers, with the system, accomplish this without being affected by high levels of contamination.

What is claimed is:

1. In a pure fluid device, a multiway vortex valve system combination comprising:
   a valve housing, a first orifice in said housing for introducing a power jet stream into said valve system;
   a second orifice in said housing for introducing a control jet stream into said valve system;
   a plurality of vortex amplifiers in said housing adapted to produce a velocity amplified fluid output;
   a first conduit means for connecting said first orifice to said vortex amplifiers;
   second conduit means for connecting said second orifice to at least one of said vortex amplifiers;
   pressure varying means mounted in said housing for varying the pressure in said second conduit means to vary proportionately and simultaneously the output of each of the vortex amplifiers connected to said second conduit means;
   a plurality of valve system output orifices, each one of which is adapted to receive fluid flow from the output of one of the vortex amplifiers;
   a return chamber formed in said valve housing for receiving fluid flow from the output of the vortex amplifiers, said return chamber having an orifice for channeling this flow back to the power jet stream
   means for channeling the vortex amplifier's output to either or both the valve system output orifice or the return chamber, depending on control jet stream velocity.

2. A device according to claim 1 wherein said plurality of vortex amplifiers each comprise:
   a first input orifice for introducing fluid flow from the power jet stream;
   a second input orifice for tangentially introducing a variable control fluid flow from the control jet stream
   an interaction chamber to allow fluid from the power jet stream and fluid from the control jet stream to coact producing a velocity amplified and proportionate output flow;
   a vortex amplifier output orifice for porting the output flow to a valve system output orifice in proportion to the input from the control jet stream.

3. A device according to claim 1 wherein said pressure varying means comprises
   a plurality of convergent nozzles;
   passageways connecting the convergent nozzles to the second conduit means connecting the control jet stream to the vortex amplifiers whose outputs are to be controlled; and
   means for restricting the fluid flow from the convergent nozzles with the result of proportionately varying the pressure in selected portions of said second conduit means thereby varying the outputs of the variable vortex amplifiers.

4. A device according to claim 3 wherein each convergent nozzle is adapted to control one of the variable vortex amplifiers.

5. A device according to claim 3 wherein the means for restricting the nozzle flow can restrict the flow of a plurality of the nozzles simultaneously.

6. A device according to claim 5 wherein the flow restricting means can restrict also the flow of each nozzle individually.

7. A device according to claim 1 wherein:
   said plurality of vortex amplifiers includes four vortex amplifiers each having:
   an input orifice for introducing fluid flow from the power jet stream;
   a second input orifice for tangentially introducing a variable control fluid flow from the control jet stream;
   an interaction chamber to allow the flows from the power jet stream and control jet stream to coact producing a velocity amplified and proportionate output flow;
   a conical output orifice to allow spin out of a portion of the vortex amplifier output when the velocity of the fluid flow from the control jet stream is increased; and
   said pressure varying means includes:
   a square control rod pivotably mounted on a ball joint in said housing so as to allow movement in any direction,
   four closable convergent nozzles connected to said second conduit means and symmetrically arranged with respect to the control rod so as to allow the square rod when moved to restrict the fluid flow from selected ones of the nozzles thereby proportionately increasing the pressure and velocity of the fluid flow from said second input orifice in the vortex amplifier affected by the selected nozzles,
   a vertical frusto-conical shaped chamber formed in said housing to channel flow from the convergent nozzles to the return chamber,
   flexible means disposed at the top of the vertical frusto-conical shaped chamber to allow movement of the square control rod and to prevent flow from the convergent nozzles from spraying upward, an inverted vertical frusto-conical shaped chamber allowing sufficient extension of the square control rod out of the valve system to permit facile application of deflection means to the square control rod, and the means for channeling have, orifices juxtaposed to each vortex amplifier's conical outlet orifice to pick up the desired output from the vortex amplifier, and conduits leading to a particular valve system output orifice.

References Cited
UNITED STATES PATENTS

| | | | |
|---|---|---|---|
| 3,324,891 | 6/1967 | Rhoades | 137—81.5 X |
| 3,351,080 | 11/1967 | Datwyler et al. | 137—81.5 |
| 3,410,291 | 11/1968 | Boothe et al. | 137—81.5 |

M. CARY NELSON, Primary Examiner

WILLIAM R. CLINE, Assistant Examiner